Dec. 14, 1937.                R. H. PREWITT                2,102,028
                        AIRCRAFT WITH SUSTAINING ROTOR
                        Filed March 11, 1936          2 Sheets-Sheet 1

INVENTOR
Richard H. Prewitt
BY
Synnestvedt & Lechner
ATTORNEYS

Dec. 14, 1937.  R. H. PREWITT  2,102,028
AIRCRAFT WITH SUSTAINING ROTOR
Filed March 11, 1936  2 Sheets-Sheet 2

INVENTOR
Richard H. Prewitt
BY
Synnestvedt + Lechner
ATTORNEYS

Patented Dec. 14, 1937

2,102,028

UNITED STATES PATENT OFFICE 2,102,028

AIRCRAFT WITH SUSTAINING ROTOR

Richard H. Prewitt, Lansdowne, Pa.

Application March 11, 1936, Serial No. 68,178

9 Claims. (Cl. 244—18)

This invention relates to aircraft of the type having a sustaining rotor which constitutes the principal means of control as well as sustension in flight.

One of the chief objects of the invention is the provision of a simplified mounting for the rotor hub providing for tilting of the rotor fore and aft as well as laterally of the craft, to effect flight and other maneuvers.

The invention also has in view a control system for tilting the rotor, which system imposes minimum bending loads on the support for the rotor, by the means described more fully hereinafter, this being of importance in view of the fact that the rotor is preferably disposed at a substantial height above the main body structure.

In connection with the above it should be noted that the reduction of bending loads on the rotor support or pylon further makes possible simplification of the rotor support, and in accordance with this invention a single mast rotor support is contemplated.

Another object of the invention concerns the disposition of the control elements for the rotor in close proximity to the rotor support, whereby the support of the control elements may all be located within a common sheathing. With reference to this matter, the structure of this invention further provides for disposition of other control elements extended to the rotor hub in close proximity to the single support, with the same end in view.

Another aspect of the invention is involved in a novel bungee or bias system provided for imposing a bias upon the tiltable rotor, this mechanism being so arranged as to utilize the force of a single spring or other yielding device for bias not only in the fore and aft plane but also in the lateral plane of tilt.

According to the invention, independent adjustment means for the longitudinal and lateral bias are provided, these being operative to impose the desired bias in each direction approximately independent of the bias in the other direction.

The invention further contemplates the employment of a control stick and novel means cooperating therewith for retaining the stick in such position as to maintain the rotor substantially horizontal when the craft is at rest on the ground, this with a view to minimizing the effect of wind at times when it is not desired that the craft should be air-borne.

How the foregoing, together with other objects and advantages as may hereinafter appear, are attained, will appear more fully as this description proceeds, reference being had to the accompanying drawings, in which—

Figure 1:
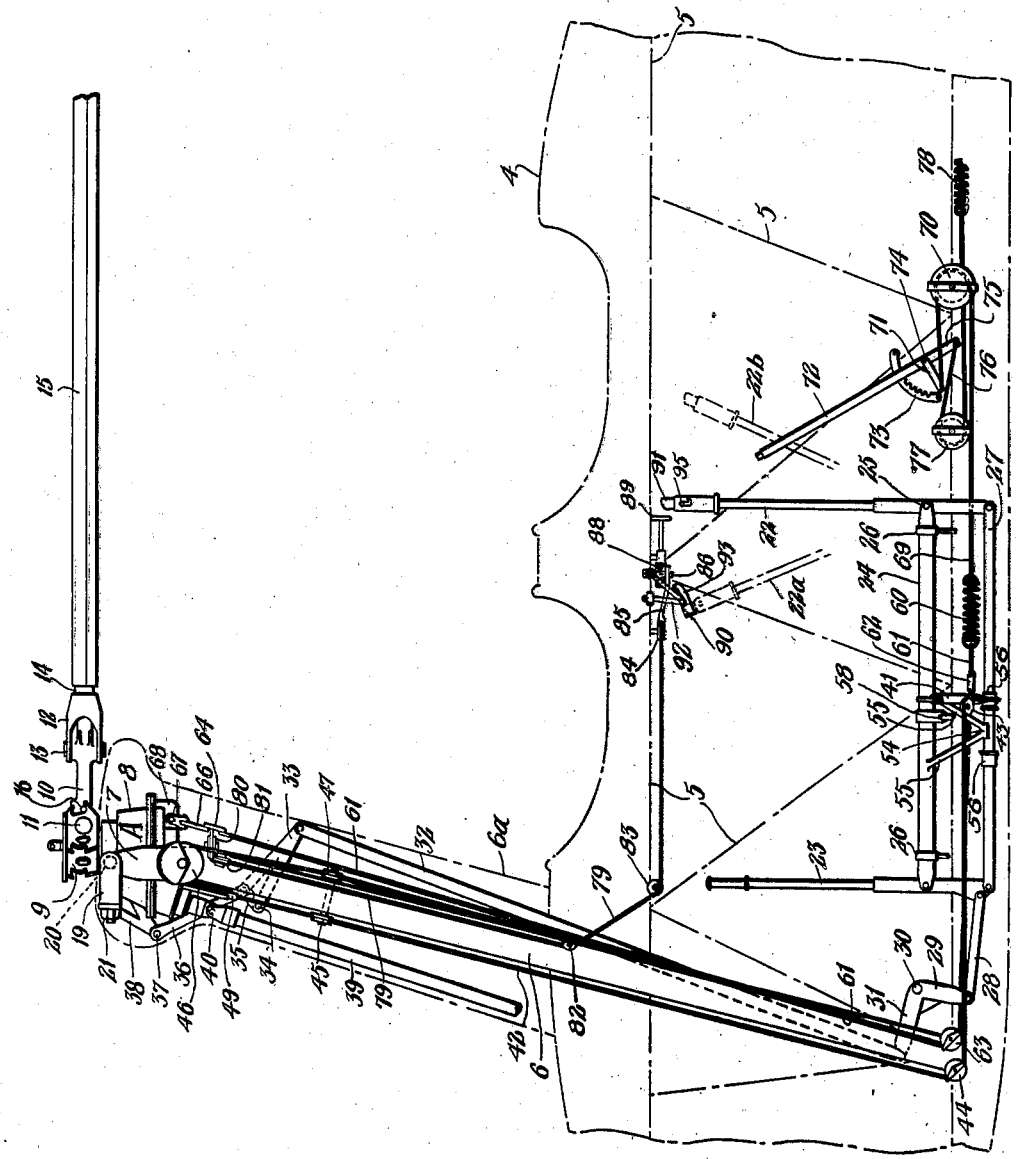
Figure 1 is a side view of a rotor hub, support and controls arranged in accordance with this invention, a portion of one blade of the rotor also being shown, as well as a portion of the fuselage in dot-and-dash outline.
Figure 3:
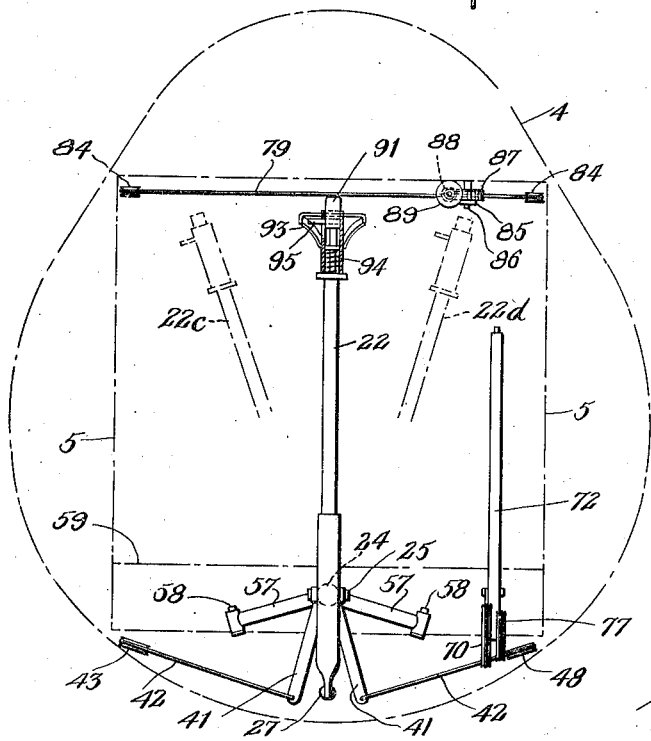
Figure 3 is a view of the control stick for tilting the rotor and also of the bias controls, this view being taken from the rear in Figure 1.

In Figures 1 and 3 the outline of the fuselage of the craft appears at 4, the numeral 5 indicating fuselage framing elements which are here shown diagrammatically since they form no part of the present invention per se.

The rotor is supported toward the top of a single tubular post, mast or pylon 6 which is fastened to fuselage framing elements within the body of the craft and extends upwardly therefrom preferably at a slightly rearwardly inclined angle. It will be observed that the mast 6 extends all the way down to the lower edge of the fuselage framing, and it should be noted that this mast is fixed to fuselage framing elements at the top as well as at the bottom, thus providing fixation at materially spaced points, above which the single post extends to provide cantilever support for the rotor. Toward its upper end the post 6 carries a yoke comprising a pair of curved members 7—7 which embrace the hub unit generally designated by the letter A. The hub unit incorporates an external casing 8 housing a rotor spindle, bearings, etc., the details of which need not be fully described herein. The rotor spindle projects above the casing 8 and carries pairs of apertured lugs 9 to which links 10 are pivoted, as by horizontal pivots 11. Each link 10 (only one being shown in the drawings) is in turn pivoted to the fork fitting 12 by a drag articulation such as the substantially vertical pivot 13. The blade fork 12 is secured to the spar 14 which in turn carries the blade proper 15.

From the above it will be seen that the individual blades of the rotor (3 being incorporated in the form shown) are each free to "flap" about the substantially horizontal pivot 11 under the influence of flight forces, and also to move fore and aft in its general path of travel about the drag articulation 13. Each blade may be supported as against excessive downward droop when it is not rotating at flight speeds, by a pin 16 set into the extension link 10 and cooperating with abutments 17 formed on the attachment ears 9. Excessive upward swinging of each blade may similarly be prevented by a stop 18 formed on each ear 9.

For purposes of control of the craft in flight, the rotor hub unit is mounted for tilting movement both fore and aft as well as laterally, so as to accomplish control in the general manner disclosed in application Serial No. 645,985, filed December 6, 1932, of Juan de la Cierva.

In accordance with the present invention, the structure providing for such tilting of the hub and the rotor includes a yoke 19 substantially horizontally embracing an upper part of the hub unit and pivotally joined by pins 20 at its ends with the upper ends of the yoke parts 7—7 projecting from the fixed pylon 6. The hub unit is carried on yoke 19 by means of a single trunnion 21, and the two trunnions 20 and 21 thus provide freedom for tilting movement of the rotor hub and the rotor as a whole both fore and aft as well as laterally of the craft. For reasons which are more fully set out in the copending application of Juan de la Cierva referred to above, the longitudinal tilting trunnion 20 is forwardly offset from the rotor axis, as seen in Figure 1, while the lateral trunnion 21 is offset from the rotor axis to the left when viewed from the rear as in Figure 2. The offset of the lateral tilting axis just referred to is proper for a rotor turning in a counterclockwise direction when viewed in top plan. The purposes of offsetting the tilting axes, and the degree of offset, are fully discussed in the aforementioned copending application of Juan de la Cierva and need not be considered in detail herein since they form no part of the present invention per se.

In addition to the devices and elements referred to above, the hub unit A preferably incorporates gearing including a ring gear and a pinion, the latter of which is adapted to be driven by the torque shaft 39 which, it will be seen, extends downwardly toward the body of the craft closely adjacent to the post 6. This shaft further is provided with flexible joints, including a universal joint 40, for the purpose of accommodating tilting movements of the hub and rotor.

The control system of this invention further includes at least one control stick 22 (a dual 23 being provided, if desired) which is pivotally mounted on the torque tube 24 at 25, this pivot providing freedom for fore and aft movement of the stick 22. The tube 24 is suitably mounted in bearings 26 and the lower swinging end of the stick 22 is joined by a compression element 27 with the lower end of stick 23, which in turn is coupled by link 28 with arm 29 of a bellcrank pivoted at 30 and having its other arm 31 joined by a push-and-pull rod 32 with arm 33 of an additional bellcrank. This latter crank is pivoted at 34 to the pylon post 6 and has an arm 35 to which the link 36 is attached, link 36 in turn being pivoted at 37 to a device 38 which is rigid with the yoke 19.

The connections just described provide for fore and aft tilting of the rotor upon fore and aft movement of the control stick 22 as suggested by the dot-and-dash positions 22a and 22b.

Lateral tilting of the hub and rotor is accomplished by lateral displacement of the control stick 22, as suggested by the dot-and-dash positions 22c and 22d in Figure 3. This movement rotates the torque tube 24 and thus also swings the arms 41—41. A control cable 42 extends laterally from the arms 41 to the rotor hub in a closed circuit which may be traced, as follows. Proceeding toward the left in Figure 3 and thence toward the left in Figure 1, the cable 42 first passes over a pulley 43 and thence forwardly to a pulley 44 from which it extends upwardly along the post 6 to a pulley 45. From this point the cable extends upwardly and takes a U turn about the pulley 46 and is carried downwardly adjacent the post 6 after passage over pulley 47 (see Figure 2). From this point the cable passes over another pulley corresponding to pulley 44 but concealed behind the pylon post 6 when viewed as in Figure 1. The circuit is completed by a rearward run to pulley 48 and final connection to the right-hand arm 41 appearing at the bottom of Figure 3.

Intermediate pulleys 45 and 46 at the front of the post 6, the cable is coupled with arm 49 of a bellcrank which is pivoted to the fixed pylon support at 50 and which has an additional arm 51 projecting laterally for pivotal attachment to the link 52. Link 52 in turn is jointed at its upper end to the arm 53 which is carried by the housing of the hub unit and projects rearwardly and thence laterally out of the open side of yoke 19.

Lateral movement of the control stick thus effects lateral tilting of the hub and rotor about the trunnion 21.

Stops for limiting longitudinal and lateral movement of the control stick are also provided in accordance with this invention. The longitudinal stop includes an abutment 54 carried on the torque tube 24 by braces 55. Upon longitudinal movement of the stick 22 the tube 27 moves with respect to the stop 54 and on the tube 27 are provided a pair of spaced cooperating stops 56. These may be set so as to permit the desired range of movement but limit movement to that range.

Limitation of the lateral movement is accomplished by a pair of arms 57 (see Figure 3) radiating from the torque tube 24 and carrying abutments in the nature of wood blocks or the like which may be cut to a desired thickness, as shown at 58. These blocks may be positioned to contact with any fixed part of the body such as the transverse fuselage brace 59.

With regard to the controls described above, attention is directed to several important advantages flowing therefrom, as follows.

In the first place, all of the control connections lie close to the single pylon post 6 and thus permit effective streamlining of the parts as by enclosure within a single shell indicated at 6a.

More important, however, is the advantage flowing from the arrangement of the operating parts in a manner which eliminates or at least substantially reduces bending loads in the pylon. Note particularly that in accordance with this invention provision is made for shifting the lift line of the rotor for control purposes and that the operating elements for controlling the shifting are mounted or pivoted on the single mast, preferably closely adjacent to the hub itself, from which region connections extend downwardly to the body in close proximity to the axis of the rotor support. Note also that these control elements all act in planes paralleling the axis of the support or single post. These factors are important in minimizing undesired stresses of the type above referred to.

In accordance with this invention, provision is also made for imposing a bias on the longitudinal and lateral controls. This bias or bungee system incorporates a main bias spring 60, one end of which is coupled by a cable 61 passing over pulleys 62 and 63 with a fitting 64 (see Figure 2) which in turn is pivotally mounted at 65 on link 66 universally jointed as at 67 to a flange or web 68 carried on the hub casing. From Figure 1 it will be seen that the point of attachment of cable 61 to the web 68 lies to the rear of the trunnion 20 for longitudinal tilting, and in view of this the force of spring 60 tends to tilt the rotor upwardly at the front. The amount of this bias may be controlled by anchoring spring 60 to an adjustable device including cable 69 passing over pulley 70 for connection with arm 71 fixed on the lever 72. Lever 72 is adapted to engage stops on the quadrant 73 for purposes of adjustment. In order to approximately balance the force of spring 60 and thus facilitate movement of the control lever 72, this lever, which is pivotally mounted at 74, has a lower extension 75 to which cable 76 is attached, the latter passing over pulley 77 connected to one end of spring 78, the other end of which may be fastened to any suitable fixed point.

Figure 2:
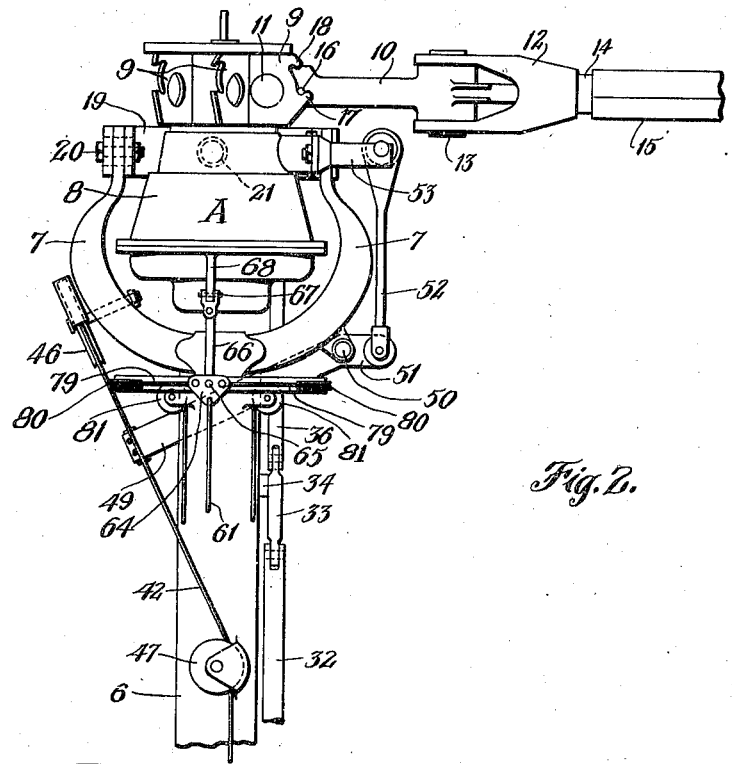
Figure 2 is a rear elevational view of the rotor hub and the adjacent part of the support therefor, together with devices embodied in the control system.

A lateral bias effect is secured by lateral displacement of the fitting 64 (see Figure 2), this being accomplished by a closed circuit cable 79, the ends of which are fastened to the fitting 64 at opposite sides thereof as clearly shown in Figure 2. From the fitting 64 the cable extends laterally in both directions to pass over pulleys 80 and thence over pulleys 81, downwardly along the pylon post 6 to a point adjacent the upper side of the fuselage, at which pulleys 82 and 83 serve to guide each run of the cable 79 laterally outwardly and then rearwardly to pass over additional pulleys 84. After this the two runs of the cable join and thus complete the circuit. For the purpose of moving cable 79 back and forth and thus controlling the lateral bungee effect, an arm 85 is secured thereto and mounted on shaft 86 which carries worm wheel 87 meshing with the worm 88 adapted to be rotated by the operating handle 89.

Rotation of the handle 89 thus displaces the fitting 64 (see Figure 2). Assuming a displacement to the left in Figure 2, it will be seen that the effect of the bias spring 60 will have a lateral component operating about the trunnion 21. In this way a single bungee device serves for both longitudinal and lateral bias effect.

In considering the operation of the bungee system, it is first pointed out that ordinarily a heavier load or bias is required in the longitudinal plane than in the lateral plane. The arrangement of the present invention meets this situation nicely, it being pointed out that a relatively heavy longitudinal bias may be secured by adjustment of the lever 72 to cause spring 60 to impose a relatively heavy load on cable 61. This loading, it will be noted, may be obtained regardless of the adjustment of the bias in the lateral plane, i. e., it may be obtained with adjustments of the lateral bias giving a substantial force or giving zero force in the lateral plane. Thus, even though the bias effect is derived from a single device, the loading and adjustments in the two different planes are in large part independent of each other.

A further feature of the invention concerns provision for retaining the control stick in a given position when the craft is at rest on the ground. This mechanism comprises a socket 90 adapted to receive plunger 91 which is mounted at the upper end of the control stick 22. This socket may conveniently be supported from other fuselage members by bracing elements 92 and divergent or flaring flanges 93 are preferably employed for the purpose of guiding the control stick into the socket.

The plunger 91 is normally urged upwardly by means of a spring 94, although it may be displaced downwardly by the pin 95 which projects laterally from the control stick. The pin, of course, is pressed down when it is desired to release the control stick, although the shape of the socket and the associated parts are preferably such as to automatically depress the plunger during movement of the control stick into engagement with the socket.

These features are preferably worked out so as to provide for fixedly positioning the control stick 22 in a position such as to dispose the rotor substantially horizontally when the machine is at rest on the ground. Possible undesirable effects of wind gusts are therefore eliminated since the gusts, with the rotor in horizontal position, will obviously have a minimum effect toward lifting the machine when it is the intention to remain on the ground.

I claim:—

1. In an aircraft having a sustaining rotor, a pylon structure for supporting the rotor, a hub support pivotally mounted on the pylon, a non-rotative hub part pivotally mounted on said support, the axes of the two pivotal mountings being angled with respect to each other so as to provide for tilting of the hub in all directions, and mechanism for controlling tilting of the hub including a lever pivoted intermediate its ends on the pylon adjacent the mounting of the hub thereon, a short push-pull member interconnecting one end of said lever and said non-rotative hub part, a second lever pivoted intermediate its ends on the pylon adjacent the mounting of the hub thereon, a second short push-pull member interconnecting one end of the second lever and said hub support, and means for actuating the other ends of both of said levers including for at least one of said levers a flexible cable connected therewith and extended downwardly for operation by an operator in the body of the craft, whereby a major portion of the load imposed in the push-pull member is carried in the pylon, thereby relieving the control means of a major portion of said load.

2. In an aircraft having a sustaining rotor, a rotor hub mounted for tilting movements in all directions to vary the position of the lift-line of the rotor, a non-rotative element tiltably movable with the rotor hub, a bungee spring anchored at one end to a fixed part of the craft, and means interconnecting the other end of said spring and said element including a tension connection transmitting the spring force to said element in one direction and another connection transmitting the spring force to said element in a direction substantially transverse the first direction.

3. In an aircraft having a sustaining rotor, a rotor hub mounted for tilting movements in all directions to vary the position of the lift-line of the rotor, a non-rotative element tiltably movable with the rotor hub, a bungee spring anchored at one end to a fixed part of the craft, and means interconnecting the other end of said spring and said element including a tension connection transmitting the spring force to said element in one direction and another connection transmitting the spring force to said element in a direction substantially transverse the first direction, and controllable means for adjusting the bungee effect transmitted to said element movable with the rotor through said two connections.

4. In an aircraft having a sustaining rotor, a rotor hub mounted for tilting movements in all directions to vary the position of the lift-line of the rotor, a non-rotative element tiltably movable with the rotor hub, a bungee spring anchored at one end to a fixed part of the craft, and means interconnecting the other end of said spring and said element including a tension connection transmitting the spring force to said element in one direction and another connection transmitting the spring force to said element in a direction substantially transverse the first direction, and controllable means for adjusting the bungee effect transmitted to said element movable with the rotor through said two connections, said controllable means being associated with the said two connections and providing for substantially independent adjustment of the bungee effect transmitted to said element in said two directions.

5. In an aircraft having a sustaining rotor, a rotor hub mounted for tilting movements in all directions to vary the position of the lift-line of the rotor, a non-rotative element tiltably movable with the rotor hub, a bungee spring, means interconnecting one end of said spring and said element including a tension connection transmitting the spring force to said element, and means interconnecting the other end of said spring to a fixed part of the craft including a second spring fixed at one end to a fixed part of the craft and an adjustable tension connection between the two springs.

6. In an aircraft having a sustaining rotor, a mounting structure for the rotor including a tubular cantilever pylon member lying in the longitudinal plane of symmetry and inclined upwardly and rearwardly, a generally semi-circular yoke attached intermediate its ends to the top of the pylon member and lying in a transverse plane, pivot means associated with the prongs of said yoke, a second yoke lying in a generally horizontal plane and pivotally mounted at its ends on said pivot means, and a non-rotative rotor hub part pivotally mounted within the second yoke intermediate the ends thereof in position to define a generally upright rotor axis rearwardly offset from the axis of said pivot means, the second yoke surrounding the forward portion of the hub part.

7. In an aircraft having a sustaining rotor, a rotor mount projecting upwardly from the main body structure of the craft and including an upwardly open yoke lying in a transverse plane, pivot means associated with the prongs of said yoke, an open-sided yoke lying in a generally horizontal plane and pivotally mounted at its ends on said pivot means, a non-rotative rotor hub part pivotally mounted within the second yoke intermediate the ends thereof in position to define a generally upright rotor axis rearwardly offset from the axis of said pivot means, the second yoke surrounding the forward portion of the hub, and means for controllably tilting the rotor hub including a control connection extended away from said non-rotative hub part rearwardly of the second yoke substantially in the plane thereof.

8. In an aircraft having a sustaining rotor, a rotor mount projecting upwardly from the main body structure of the craft and including an upwardly open yoke lying in a transverse plane, pivot means associated with the prongs of said yoke, an open-sided yoke lying in a generally horizontal plane and pivotally mounted at its ends on said pivot means, a non-rotative rotor hub part pivotally mounted within the second yoke intermediate the ends thereof in position to define a generally upright rotor axis rearwardly offset from the axis of said pivot means, the second yoke surrounding the forward portion of the hub, and means for controllably tilting the rotor hub including a control connection extended away from said non-rotative hub part rearwardly of the second yoke substantially in the plane thereof, the means for controllably tilting the hub further including a lever pivotally mounted on the rotor mount closely adjacent to the hub, a push-pull element interconnecting one arm of said lever and said connection, and a flexible actuating cable connected with another arm of said lever at a distance from its pivotal mounting greater than the distance between the pivotal mounting of the lever and the point of connection of said push-pull element with said lever.

9. In an aircraft having a sustaining rotor with flappingly pivoted blades, a pylon structure for supporting the rotor, a hub support pivotally mounted on the pylon, a non-rotative hub part pivotally mounted on said support, the axes of the two pivotal mountings being angled with respect to each other so as to provide for tilting of the hub in all directions, and mechanism for controlling tilting of the hub including a lever pivoted intermediate its ends on the pylon adjacent the mounting of the hub thereon, a short push-pull member interconnecting one end of said lever and a part tiltable with the rotor hub, and a flexible control cable connected with the other end of said lever and extended downwardly for actuation by an operator in the body of the craft, the two ends of said lever being proportioned to reduce the load in the control cable as compared with the load in the push-pull member, whereby a major portion of the control and blade flapping loads imposed on the push-pull member are carried in the pylon, thereby relieving the control cable of a major portion of said load.

RICHARD H. PREWITT.